United States Patent
Slepov et al.

(10) Patent No.: US 11,257,641 B1
(45) Date of Patent: Feb. 22, 2022

(54) SPLIT KEYBOARD WITH WRIST SUPPORT AND ADJUSTABLE THUMB CLUSTER

(71) Applicants: Dmitry Slepov, Taipei (TW); Erez Zukerman, New Dundee (CA)

(72) Inventors: Dmitry Slepov, Taipei (TW); Erez Zukerman, New Dundee (CA)

(73) Assignee: ZSA Technology, Inc., New Dundee (CA)

( * ) Notice: Subject to any disclaimer, the term of this patent is extended or adjusted under 35 U.S.C. 154(b) by 356 days.

(21) Appl. No.: 16/360,607

(22) Filed: Mar. 21, 2019

Related U.S. Application Data

(60) Provisional application No. 62/645,803, filed on Mar. 21, 2018.

(51) Int. Cl.
| | |
|---|---|
| H01H 13/84 | (2006.01) |
| G06F 3/02 | (2006.01) |
| B41J 5/10 | (2006.01) |

(52) U.S. Cl.
CPC ............... *H01H 13/84* (2013.01); *B41J 5/10* (2013.01); *G06F 3/0216* (2013.01); *H01H 2217/034* (2013.01)

(58) Field of Classification Search
CPC .... H01H 13/84; H01H 13/86; H01H 2223/05; H01H 2217/034; H01H 2217/08; G06F 3/0216; G06F 3/0221; G06F 3/0208
See application file for complete search history.

(56) References Cited

U.S. PATENT DOCUMENTS

| | | | |
|---|---|---|---|
| 8,405,615 B1* | 3/2013 | Williams | G06F 3/0216 345/168 |
| 2008/0232891 A1* | 9/2008 | Macklin | G06F 3/0216 400/489 |
| 2010/0026626 A1* | 2/2010 | Macfarlane | G06F 3/0219 345/160 |

FOREIGN PATENT DOCUMENTS

CN  107544681 A  * 1/2018

OTHER PUBLICATIONS

ErgoDox EZ Shine Keyboard Review!; Youtube.com video; https://www.youtube.com/watch?v=6YQGbiNnwWw; randomfrankp; published Feb. 24, 2017, accessed Jun. 14, 2021. (Year: 2017).*

* cited by examiner

*Primary Examiner* — Daniel J Colilla

(57) ABSTRACT

A split keyboard is disclosed that has wrist support members that are pivotally attached to the front of key array sections and thumb cluster sections that are pivotally attached to the key array sections on a transitional side that extends in diagonal direction from a front side of the key array section to a lateral side of the key array section.

20 Claims, 9 Drawing Sheets

SPLIT KEYBOARD WITH WRIST SUPPORT AND ADJUSTABLE THUMB CLUSTER

1. REFERENCE TO RELATED APPLICATION CASES

The Applicants claim the benefit of the filing date of U.S. Application No. 62/645,803 filed on Mar. 21, 2018.

2. TECHNICAL FIELD

The present invention relates to an ergonomic split computer keyboard device that has a thumb cluster of keys positioned on a different plane than the primary keys presented for access by a user's fingers. The structure disclosed is intended to minimize stress on a user's hands, wrists, arms, and shoulders without adversely affecting work performance.

3. BACKGROUND OF THE INVENTION

Standard keyboard arrangements are well known. The most widely used English-language alphabetic key arrangement is referred to as the QWERTY arrangement which is named for the arrangement of an upper horizontal row of keys. Most qwerty arrangements use an offset key arrangement wherein keys are not in vertical alignment with one another. A conventional computer keyboard with a flat layout of keys requires a user to move his or her thumbs in a direction substantially perpendicular to the palm. With conventional keyboards, a user's palms "float" in the air or rest on the desk in front of the keyboard and the wrist and fingers bend upward to depress the keys. Consequently, the muscles and tendons in the lower arm, neck, and shoulders must continually support the fingers at this upward angle to prevent the fingers from inadvertently striking the keys. Maintaining this position while typing for an extended period of time can strain the muscles and tendons of the lower arm, neck, and shoulders and may significantly contributes to Carpel Tunnel Syndrome and other repetitive strain injuries. These health issues may particularly affect those keyboard users that spend long period of time using a keyboard including secretaries, authors, data entry personnel, computer programmers, call center customer service personnel, and computer gamers.

It has been reported that computer users sometimes complain of back and neck pain after spending time typing at a desk or workstation. The inefficient style of the conventional keyboards may cause some users to position their arms close together to type and orient their hands in a direction that is substantially perpendicular from their body which may also negatively impact the muscles of the back and neck.

Ergonomic keyboards often try to address the following issues: Deviation, which refers to the lateral bending of the wrists; Pronation, or the inward twisting of the wrist, and; Extension which describes the back-bending of the wrists. Orienting the keys in a manner that allows thumb movement in a separate plane, parallel to the palm, sometimes referred to as "radial abduction," is one design technique that reportedly results in a more comfortable and ergonomic interface. An example of a keyboard that is found in the patent to Edenborough U.S. Pat. No. 8,681,102.

While problems with conventional keyboard arrangements are well known, there have been numerous efforts directed at providing improved ergonomic keyboard designs to relieve stress on the body, nd mitigate health problems such as carpal tunnel and tendonitis.

The patent to Hargreaves, U.S. Pat. No. 6,005,496 discloses several split keyboards arrangements and includes an embodiment where opposite key arrays are mounted to provide for rotation on a base member which allows the user to orient an orthogonal key array in a custom position. The '496 Patent was assigned to Kinesis Corporation of Bothell, Wash. and a commercial embodiment was sold under the Kinesis Advantage brand. It also discloses thumb clusters.

A popular prior art split keyboard design, referred to as the Ergodox, was designed by Dominic Beauchamp and who was reportedly inspired by the Key64 and the Kinesis Advantage. As shown in FIG. 1, the Key64 keyboard 100 is a split keyboard that uses a thumb cluster of keys 102 offset from the primary array 104. Referring now to FIG. 2, the Kinesis Advantage keyboard 200 has two concave arrays 205 and 207 arranged on base member 210. Keyboard 200 includes fixed thumb cluster keys 209 and 212. As shown in FIG. 3, the Ergodox keyboard 300 is an ergonomic design that is characterized by two separate halves 302 and 304 with primary key arrays 306 and 308, each with a columnar staggered layout. The user can adjust the two halves of the keyboard at an angle to align with their hands at a natural and ergonomic position. It uses a thumb cluster sections 310 and 312 that are offset from the primary key arrays 306 and 308.

FIG. 4 depicts yet a further keyboard design 400 created by Matthew Adereth, that is referred to as the Dactyl Keyboard. As seen in FIG. 4 keyboard 400 is a parameterized, split-hand, concave, columnar, ergonomic keyboard and is a further variation on the Ergodox design. The thumb cluster 401 is positioned in a concave arrangement at a location lateral and slightly above the concave columnar key array section 403.

The patent to Caplan, U.S. Pat. No. 7,182,533 is directed to an improved keyboard with keys arranged so that they minimize the distance a finger typically must travel to affect a keystroke and the force that is applied to affect a keystroke. Accordingly, this design reportedly required less arm and finger movement to and thereby reduce the likelihood of an operator developing a repetitive stress injury (RSI). In one embodiment the keyboards comprise a plurality of keys disposed such that the alphanumeric keys form a continuous key array defining a key array surface having at least two concave regions wherein a plurality of keys present irregular and/or non-rectilinear striking faces.

Other prior art ergonomic keyboards include the Maltron Keyboard, the Matias Eagle Pro, the Matias Mini Quiet pro, the Mistel Barocco Split Keyboard, the Atreus62 Keyboard, the Cherry ErgoPlus, the Esrille New Keyboard, the Kinesis Avantage2, the Kinesis Edge, the ManuForm Hand-Shaped Keyboard, and the IBM M15 Split Ergonomic Keyboard.

Notwithstanding the many ergonomic designs and orientations in the prior art, there remains a need for keyboards that provide users with additional options and particularly options that provide a comfortable and adjustable configuration of keys with respect to the user's hands.

4. BRIEF SUMMARY OF EMBODIMENTS OF THE INVENTION

The present invention generally relates to an improved computer keyboard configuration that provides users with increased comfort. The configuration of the keyboard allows users a more efficient, comfortable, and natural way to type. The keyboard disclosed permits computer users a more efficient and less stressful way to type and is intended to reduce strain on the body.

The present invention is a split keyboard, wherein each half comprised a section having primary keys on primary support base section in a columnar array and defining a first plane. In embodiments, adjustable support legs are provided that extend from the lateral sides of the keyboard primary base section to elevate the rear edge and form a slope. Thumb cluster sections are provided on a second planar base section and the angle of the planar base section can be adjected with respect to the angle of the primary support base section. Alternatively, the support leg can be positioned to cause the primary base section to be oriented in a substantially horizontal position, which is substantially parallel to the table top or other surface on which it is placed. Further embodiments of the invention include a wrist support section that is attached to the primary support base section. The keyboard device of the present invention is preferably collapsible for storage and shipping.

5. BRIEF DESCRIPTION OF THE DRAWINGS

6. DETAILED DESCRIPTION OF THE INVENTION

Figure 1:
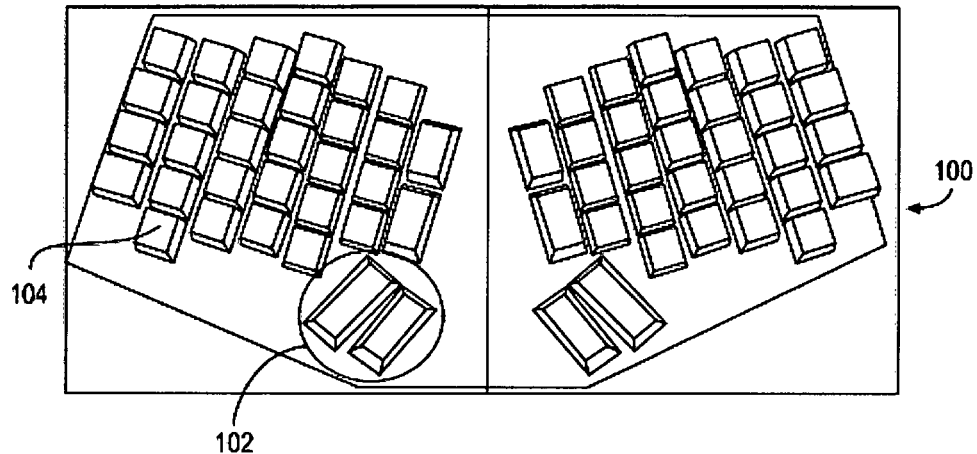
FIG. 1 is a top view of the prior art Key64 keyboard device.
Figure 2:
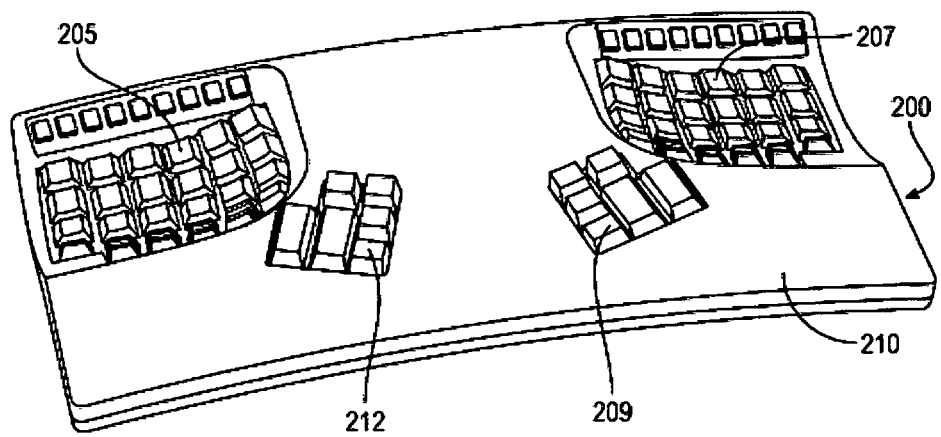
FIG. 2 is a top view of the prior art Kinesis Advantage keyboard device.
Figure 3:
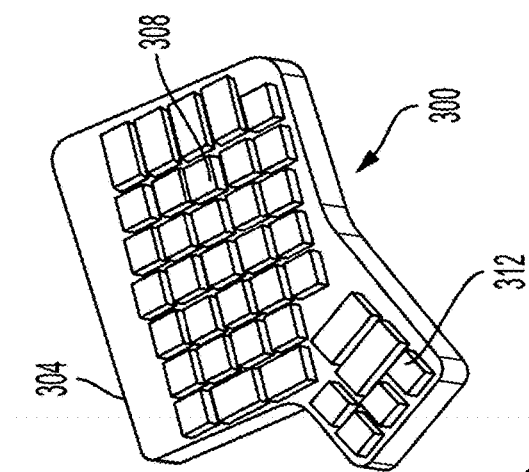
FIG. 3 is a top view of the prior art Ergodox keyboard device.
Figure 4:
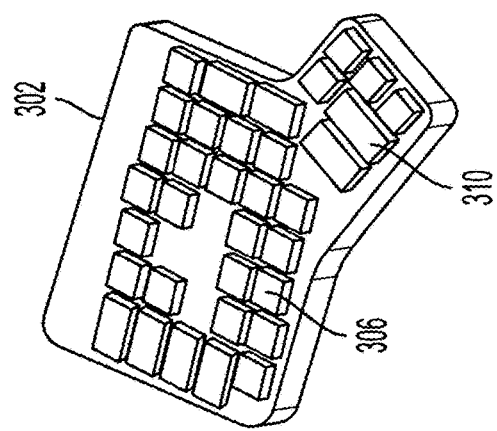
FIG. 4 is a perspective view of the prior art Dactyl keyboard device.
Figure 4:
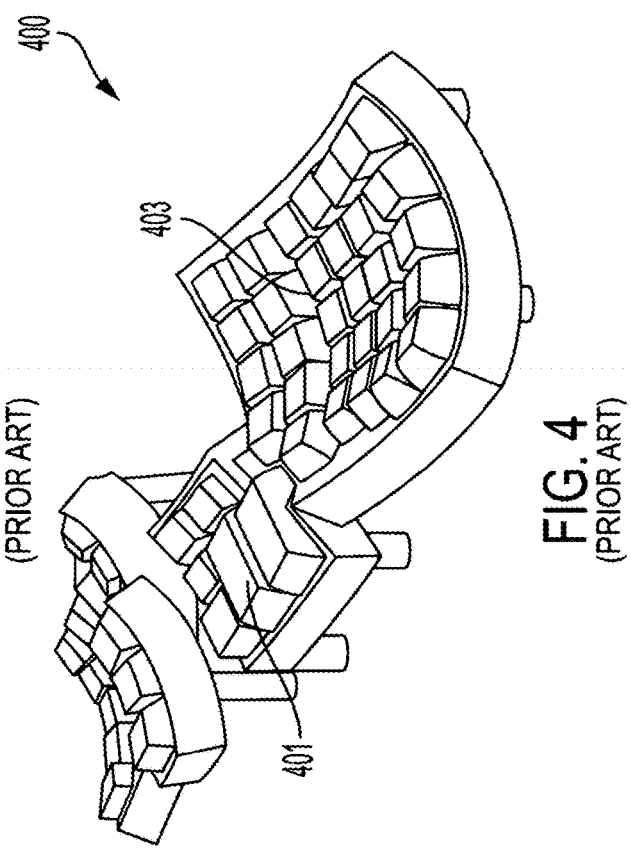

In the following description, like reference characters designate like or corresponding parts throughout the several views. Referring in more detail to the drawings, multiple devices embodying the principles and concepts of the present invention are described, a first embodiment generally designated by the reference numeral 500, a second embodiment 1200, and a third embodiment 1400 are described.

Figure 5:
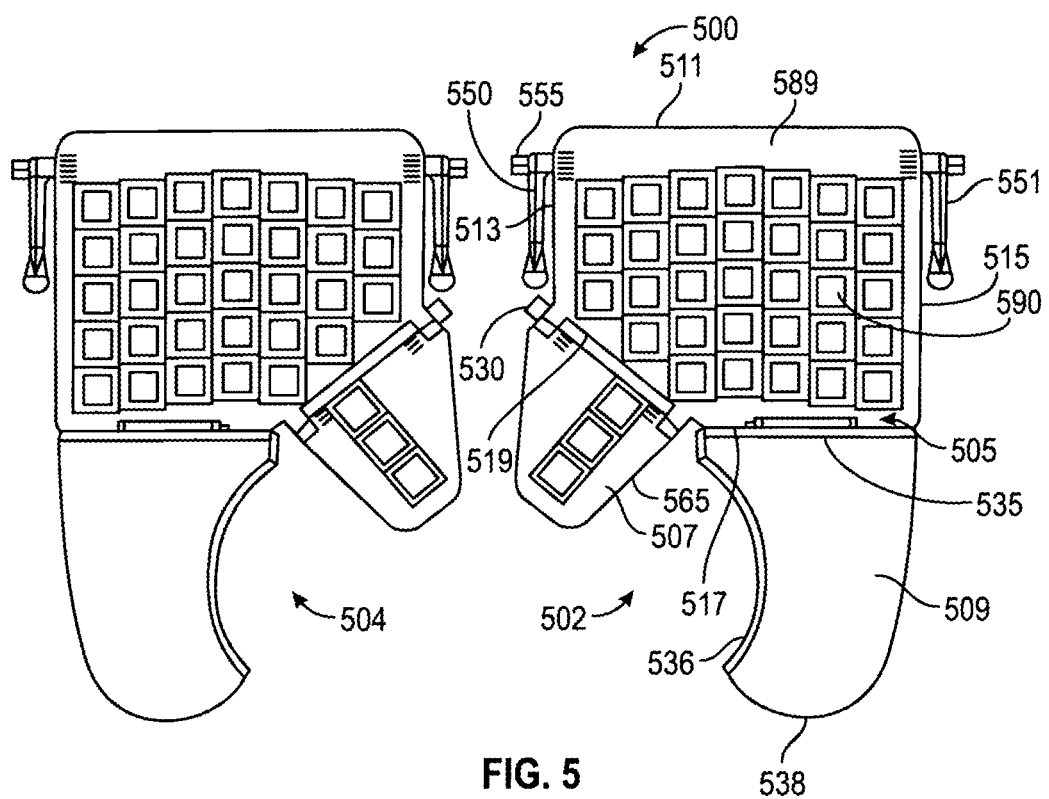
FIG. 5 is a top plan view of an embodiment of the keyboard device according to the present invention having two separate elements.

Now referring to FIG. 5, a top view of the ergonomic keyboard 500 is depicted that is intended to ease stress on a user's hands, wrists, arms, and shoulders over time by allows the user to keep his hands, wrists and arms in a comfortable and ergonomic position during use in comparison to a conventional planar keyboard. Keyboard 500 is comprised of two separate halves shown adjacent to another 502 and 504. and with the keys in a generally running horizontally and vertically in a columnar arrangement, the keyboard halves 502 and 504 can be adjusted in any orientation with respect to each other. Section half 502 of the keyboard device includes primary key array base support section 505, thumb cluster section 507, wrist support section. The primary key array base support section 505 includes a five-sided polygon base member 506 which is generally planar. The top surface of base member 506 receives keys 590 and base member 506 includes rear side 511, lateral sides 513 and 515, front side 517 and transverse or diagonal side 519 that extends from front side 517 to lateral side 513. The key's arranged in the primary key array section 505 are columnar in the embodiment of FIG. 5. Pivotally attached to transverse side 519 of key array section using a hinge 519 is thumb cluster base section 507. The thumb cluster base section 507 is attached with a hinge so that it may be oriented at different angles with respect to the primary key array base member 506.

Figure 6:
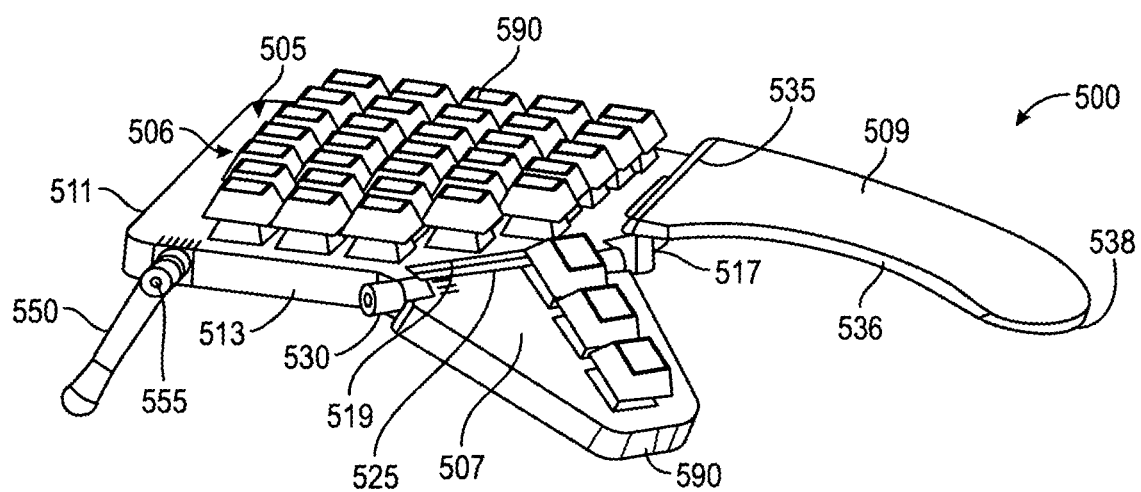
FIG. 6 is a side perspective view of the embodiment of FIG. 5 shown in a first position wherein the rear of the key array section is elevated with legs, the thumb cluster section extends downward and forward and a wrist support member extending from the front of the key array section.

As seen in FIG. 6, in an exemplary orientation, thumb cluster base section 507 extends downward from primary key array base section to a support surface (not shown). A hinge 525 connecting the key array base section 505 and thumb cluster section 507 may be secured in a fixed positioned by manipulation of the thumb screw 530 located at the end of the hinge 525. When thumb screw 530 is turned counter-clockwise it will release the grip and allow the key array base section 505 and thumb cluster section 507 to pivot. Also shown in FIG. 6 is the wrist support member 509 that is attached to front side 517 of the key array base section 505. Wrist support member 509 has thin profile and is generally in the shape of a truncated oval or parabola that has a proximal edge 535. Proximal edge 535 is attached to the key array base section 505 using a hinge 535 at front side 517 of key array base section 505. A cutaway section of wrist support 509 along a lateral side having an arcuate edge 536 allows for increased vertical movement of a user's thumb as it extends from wrist support 509 towards the thumb cluster section 507. The arcuate wrist support 509 is attached to front side 517 of the key array base member 505 using hinge 535 to allow it to pivot wherein the distal end 538 of member 509 will contact a support surface. In embodiments, the top surface of the wrist support 509 is provided with a yielding material such as foam polymer covered with fabric so that a user's wrists can comfortably rest on the wrist support.

Referring back to FIG. 5, extending from lateral side 513 and lateral side 515 are, respectfully, legs 550 and 551. Leg 550 is attached to base support member 505 using thumbscrew 555 that allows for the adjustment of the height of the rear side 511 of the key array base section 505 by pivoting the legs to reach a desired elevation and then securing the thumbscrews. As best seen in FIG. 6, leg 550 elevates the rear side 511 of the base section 505 from a support surface. FIG. 6 show the thumb support base section 507 extending from the base support section 505 and creating an angle between the planes defined by section 505 and 507 is that is more than 180 degrees. The lower edge 590 of thumb cluster base section 507 contacts the support surface and supports the front side of key array base section 505.

Figure 7:
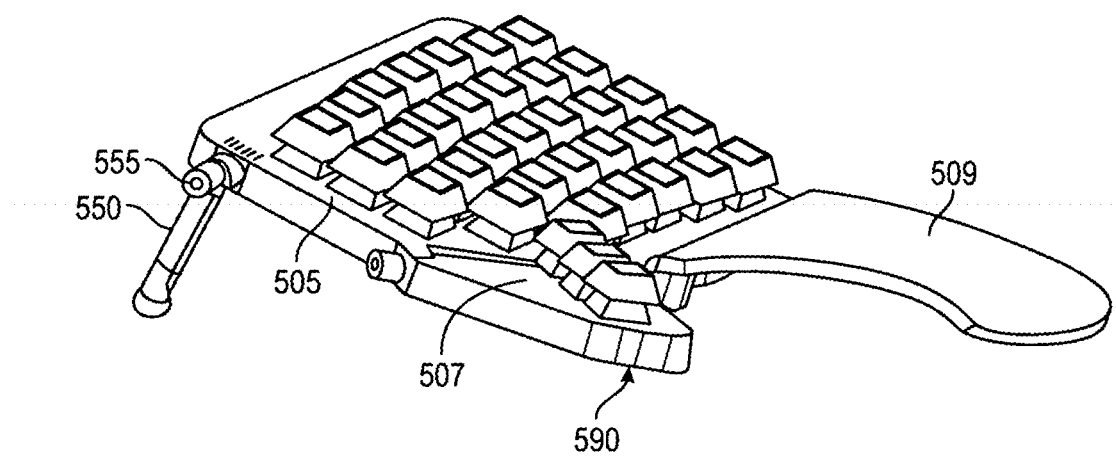
FIG. 7 is a side perspective view of the embodiment of FIG. 5 shown in a second position wherein the rear of the array section is elevated with legs, the thump cluster section extends lateral from the front corner of the key array section and a wrist support member extending from the front of the array.
Figure 8:
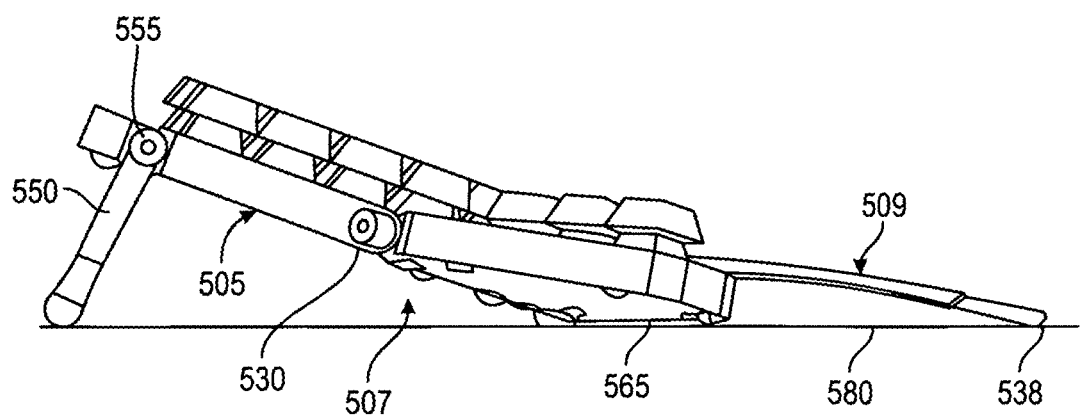
FIG. 8 is a side elevational view of the embodiment of FIG. 5 shown in the second position.

Referring now to FIG. 7, again referring to the embodiment of FIG. 5, the device is shown with thumb cluster member 507 extending from the base member 506 in an orientation that forms a slight concave angle. In this configuration, the edge 590 of thumb cluster base member 507 does not serve to support the device but rather the edge 65 comes into contact with the support surface. The two parts can be secured into a fixed position in this orientation by manipulation of thumb screw 530 which creates a frictional engagement between opposite hinge elements connected to primary key base member 506 and thumb cluster 507. It should be understood that the hinge provides a relatively wide range of angles that a user may select and then tighten the thumbscrew to secure the thumb cluster section 507 and primary key array base member 506 in a desired orientation. As best seen in FIG. 8, in the orientation illustrated in FIGS. 7 and 8, edge 565 of the thumb cluster member base member 507 contacts the support surface 580. The front edge of the primary key surface is oriented at a lower position and in contact with the support surface 580. The wrist support member 509 contacts the support surface 580 at its distal end 538 like in the previously described orientation depicted in FIGS. 5 and 6. FIG. 8 shows the edge of the thumb cluster 525 in contact with a support surface 580 as well as the distal edge 538 of wrist support member 509.

Figure 9:
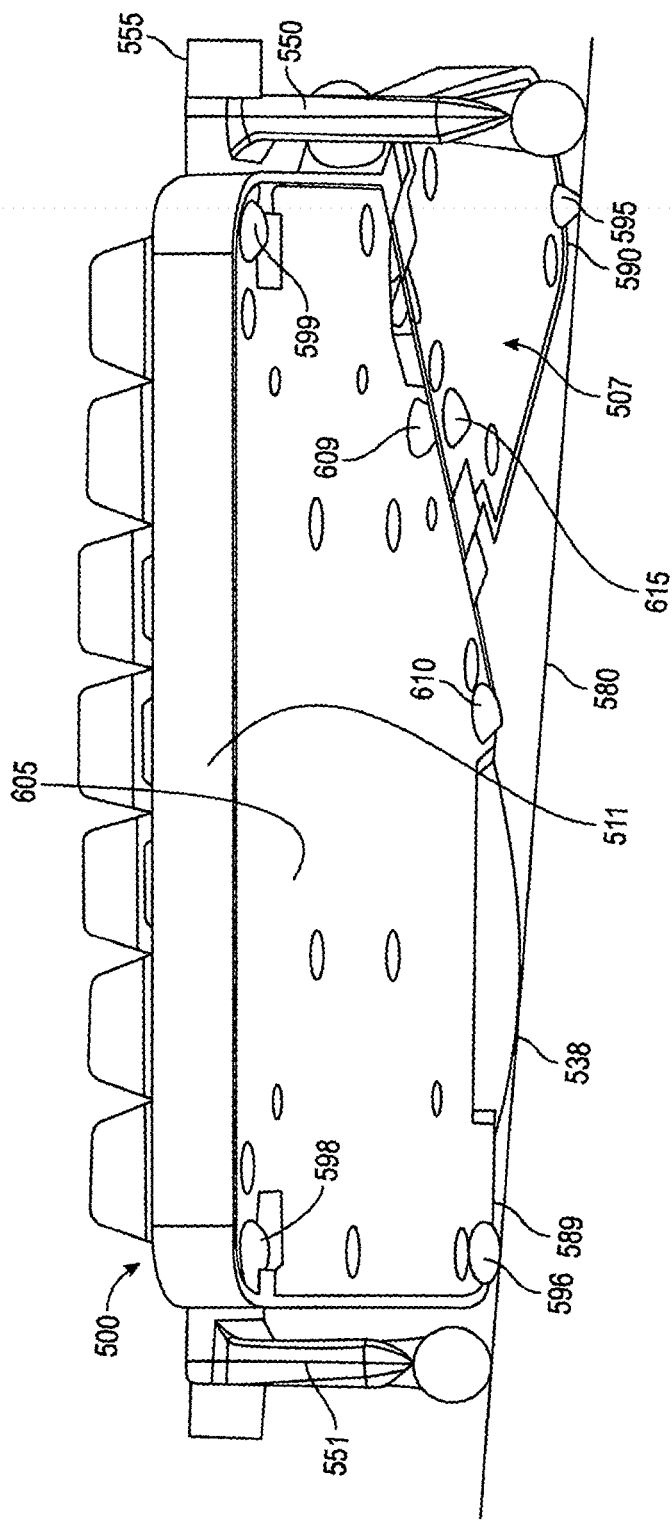
FIG. 9 is a rear elevational view of the embodiment of FIG. 5 shown in the second position.

FIG. 9 is a rear elevational view of the embodiment of FIG. 5 that shows the orientation of the device as depicted in FIGS. 5 and 6. In this orientation, the rear edge 511 of the primary key array base member 506 is elevated by legs 550 and 551. The front lower edge 589 of base member 506 is in contact with the support surface 580 as well as the lower edge 590 of thumb cluster section member 507. The distal end 538 of wrist support member 509 is also in contact with the support surface 580. The rear view of the device also shows front feet 596 and 610, rear feet 598, 596, 610 and 609 and 599 all of which extend from bottom surface 605 of the base member 506. These feet, which may be made of a rubber or polymer, serve to increase the friction between the device and a support surface in certain orientations and also serve to dampen vibrations. These feet will engage a support surface when the primary key base member 506 is not elevated by legs 551 and 550. Thumb cluster section 507 also has three feet including 615 and 595 which extend from the lower surface 620 of thumb cluster base member 507. By pivoting the thumb cluster section 507 to an acute angle with respect to base member section, the distance between the keys form the thumb and the key array may be reduced, thereby providing a manner in which to adjust the keyboard to conform to the hand size of the user.

Also shown in FIG. 9 is the contact with the support surface 580 by both distal end 538 of wrist support 509 and lower front surface 590 of the thumb cluster section 507. In FIG. 9, the rear side 511 of the keyboard half of the key array base member 506 is shown elevated substantially above the flat surface of a table or desk top. The adjustable support legs 551 and 550 elevate the rear edge of the primary key array member 506 between about one to two inches, most preferably about 1.5 inches above the support surface 580. The keyboard ordinarily inputs to a computer device (not shown) in a conventional manner. The keyboard includes several keys 28 on its upper surface, including a key for each individual letter of the alphabet.

Figure 10:
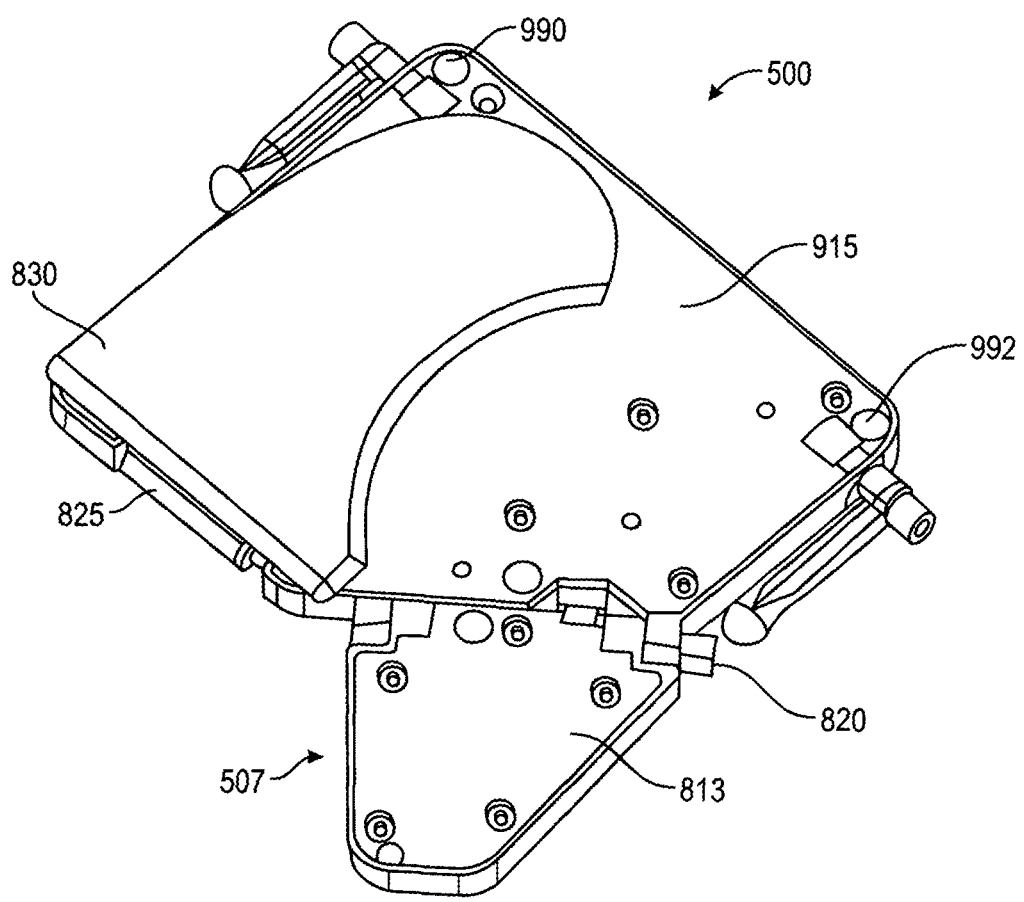
FIG. 10 is a bottom view of the embodiment of FIG. 5 showing the wrist support member folded under the bottom surface of the key array section.
Figure 11:
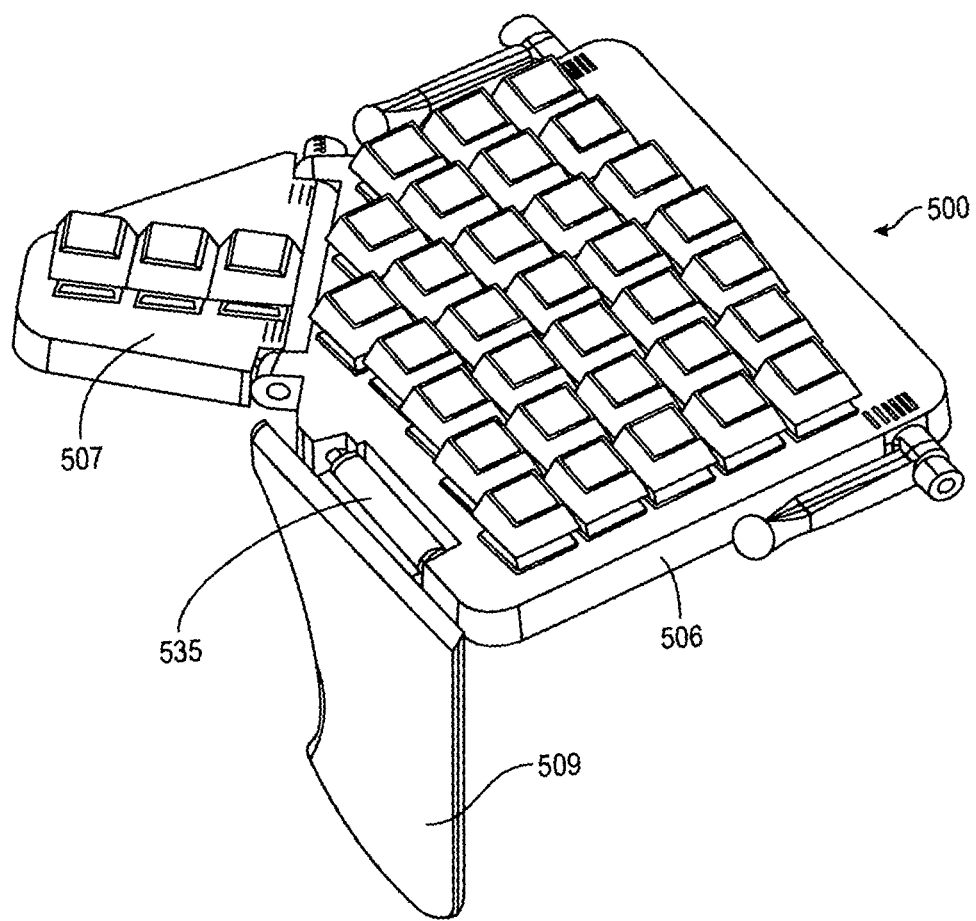
FIG. 11 is a perspective view of the embodiment of FIG. 5 depicting the wrist support extending downward from the key array section.

FIG. 10 is a bottom view of the keyboard device 500 shown in FIG. 5 with the wrists support member 507 folded back underneath the device. This view includes rear surface 915 of base member 506 and rear surface 813 of thumb cluster section 805. FIG. 11 is yet a further view of the keyboard device 500 that depicts the degree of freedom of the hinge 535.

Figure 12:
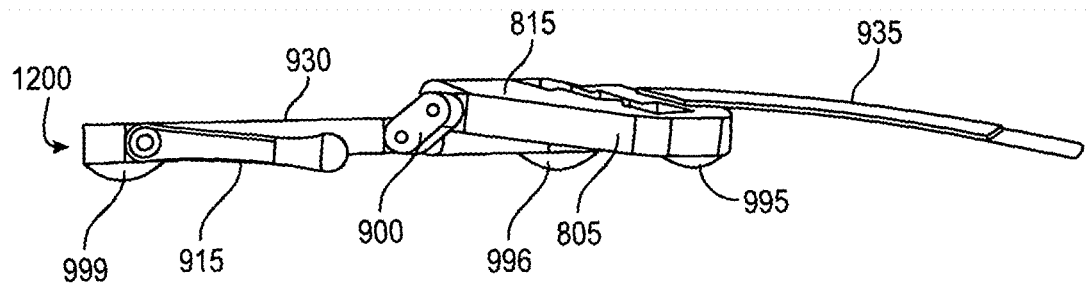
FIG. 12 is a side elevational view of a second embodiment of the invention wherein the thumb cluster has increased freedom of movement between the key array section and the thumb cluster section.
Figure 13:
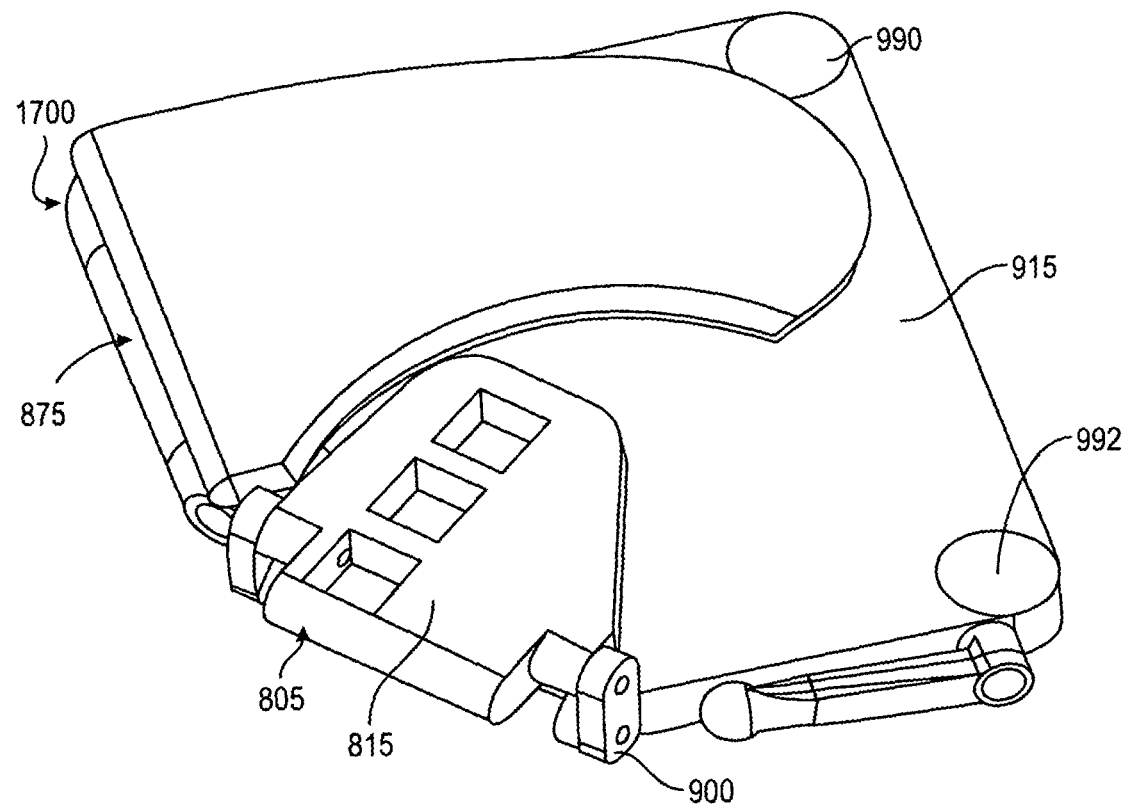
FIG. 13 is a bottom view of the embodiment shown in FIG. 12 with the wrist support and thumb cluster folded against the bottom surface of the key array section.

FIG. 12 depicts a second embodiment of a keyboard 1200 that is characterized by a hinge between a primary key array support member 930 and a thumb cluster 815. This embodiment is similar to the embodiment of FIG. 5 however the hinge 900 has two pivot points and allows the thumb cluster 805 to fold back underneath the primary keyboard base member 930. This feature is advantageous for shipping and storage of the unit and the hinge provide a greater degree of freedom compared to the hinge of the embodiment of FIG. 5. In FIG. 12, the orientation of the primary keyboard array base member 930 is flat and the thumb cluster 805 is slightly elevated from the bae member 930 and extends downward to a support surface. In this orientation the leg 915 is shown in the same plane as base member 930. The embodiment has a wrist support member 935 that is pivotally attached to base member 930. As best seen in FIG. 13 the hinge device 900 allows the thumb cluster 805 to be folded to lay against rear surface 915 of the base member 930. This embodiment also has feet 990 and 992 that extend from rear surface 915. Top surface 815 of thumb cluster 805 is designed to received key switches in cavities 940 941 and 942.

Figure 14:
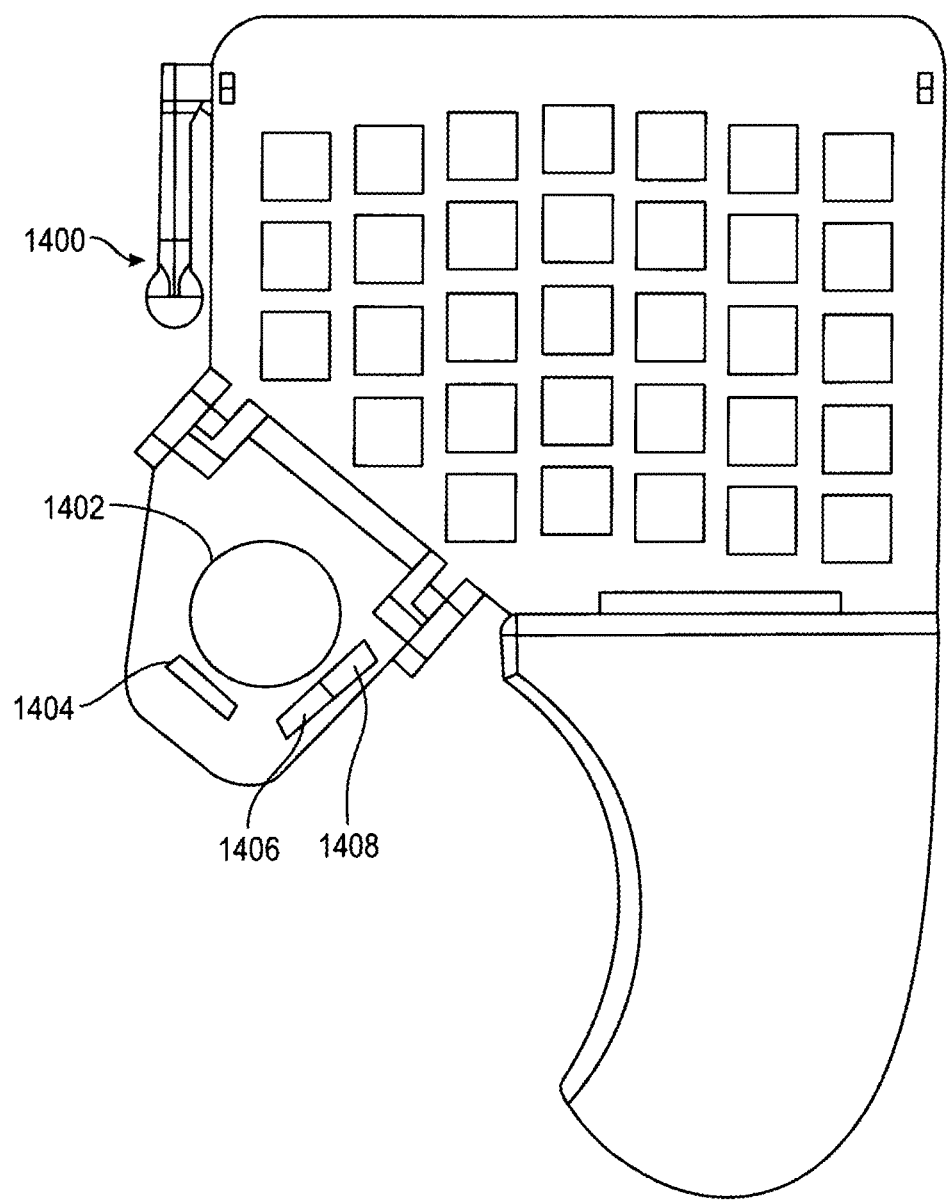
FIG. 14 is a top plan view of a further embodiment of the invention.

FIG. 14 is a further embodiment of the invention that uses a trackball, 1402 and associated scroll wheel 1404, and switches 1406 and 1408 on a thumb cluster base plate.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items. Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

We claim:

1. A split keyboard comprising:
   two separate parts, each said part comprising
   a main keyboard section that comprises
      a base, and a plurality of keys, said main keyboard section further having a front side, opposite lateral sides, a rear side, and a diagonal side, said diagonal side connecting said front side to one of said lateral sides,
   a wrist support section, said wrist support section extending forward from said front side of said main keyboard section, and
   a thumb accessible section, said thumb accessible section extending from said diagonal side, wherein said thumb accessible section comprises a planar base part that is pivotally attached to said base of said main keyboard section with a hinge thereby allowing it to be positioned in different planes than a plane defined by said base of said main keyboard section.

2. The keyboard of claim 1 wherein each said wrist support section is pivotably attached to said front side of said main keyboard section with a hinge.

3. The keyboard recited in claim 1 wherein each said thumb accessible section comprises keys.

4. The keyboard recited in claim 1 wherein at least one of said thumb accessible sections comprises keys.

5. The keyboard recited in claim 1 wherein at least one of said thumb accessible sections comprises a track ball.

6. The keyboard of claim 1 wherein at least one of said thumb accessible sections comprises a touchpad and control switches.

7. The split keyboard recited in claim 1 wherein the orientation of the keys on each of said main keyboard sections comprises a plurality of keys in a plurality of columns in a direction perpendicular to said front side and said keys are arranged in a straight line.

8. The split keyboard recited in claim 1 wherein each said main keyboard section further comprises adjustable legs that allow said rear side of each of said main keyboard section to be elevated on a planar work surface with respect to said front side.

9. The keyboard of 1 wherein the main sections, when combined, comprise keys in a QWERTY array of the letters A-Z.

10. The keyboard recited in claim 1, wherein each said thumb accessible section has a planar bottom surface and each said thumb accessible section is attached to one of said main keyboard sections to allow for pivotal motion about said hinge and to a position wherein said bottom surface of said thumb accessible section contacts a bottom surface of one of said main keyboard sections and therefore said thumb accessible section can be folded under said main keyboard section.

11. The keyboard recited in claim 1 wherein each said wrist support section has a bottom surface and said wrist support section is attached to one of said main keyboard sections to allow for pivotal motion about said hinge and to a position where said bottom surface of said wrist support section contacts a bottom surface of one of said main keyboard sections and therefore said wrist support section can be folded under said main keyboard section.

12. A split keyboard comprising:
two separate parts, each said part comprising
a main keyboard section that comprises
a base, a front side, opposite lateral sides, a rear side, and a diagonal side, said diagonal side connecting said front side to one of said lateral sides, and a plurality of keys for providing input,
a thumb accessible section, said thumb accessible section extending from said diagonal side of said main keyboard section, wherein said thumb accessible section comprises a planar section that is pivotally attached to said main keyboard section thereby allowing it to be positioned in different planes than a plane defined by the base of said main keyboard section.

13. The keyboard recited in claim 12 wherein each said thumb accessible sections comprises keys.

14. The keyboard recited in claim 12 wherein at least one of said thumb accessible sections comprises keys.

15. The keyboard recited in claim 12 wherein at least one of said thumb accessible sections comprises a track ball.

16. The keyboard of claim 12 wherein at least one of said thumb accessible sections comprises a touchpad and control switches.

17. The keyboard recited in claim 12 wherein the orientation of the keys on each said main keyboard section comprises a plurality of keys in a plurality of columns in a direction perpendicular to said front edge and arranged in a straight line.

18. The keyboard recited in claim 12 wherein each said main section further comprises adjustable legs that allow the rear side of said each of said main keyboard sections to be elevated on a planar work surface with respect to said front side.

19. The keyboard recited in claim 12 wherein said main keyboard sections, when combined, comprise keys having a QWERTY layout.

20. The keyboard recited in claim 12 wherein each said thumb accessible section has a planar bottom surface and each said thumb accessible section is attached to one of said main keyboard sections to allow for pivotal motion about said hinge and to a position where said bottom surface of said thumb accessible section contacts a bottom surface of one of said main keyboard sections and therefore said thumb accessible section can be folded under said main keyboard section.

\* \* \* \* \*